Jan. 21, 1958     H. A. PUCKETT     2,820,405
EARTH WORKING ATTACHMENT FOR TRACTOR
Filed June 22, 1955                                          2 Sheets-Sheet 1
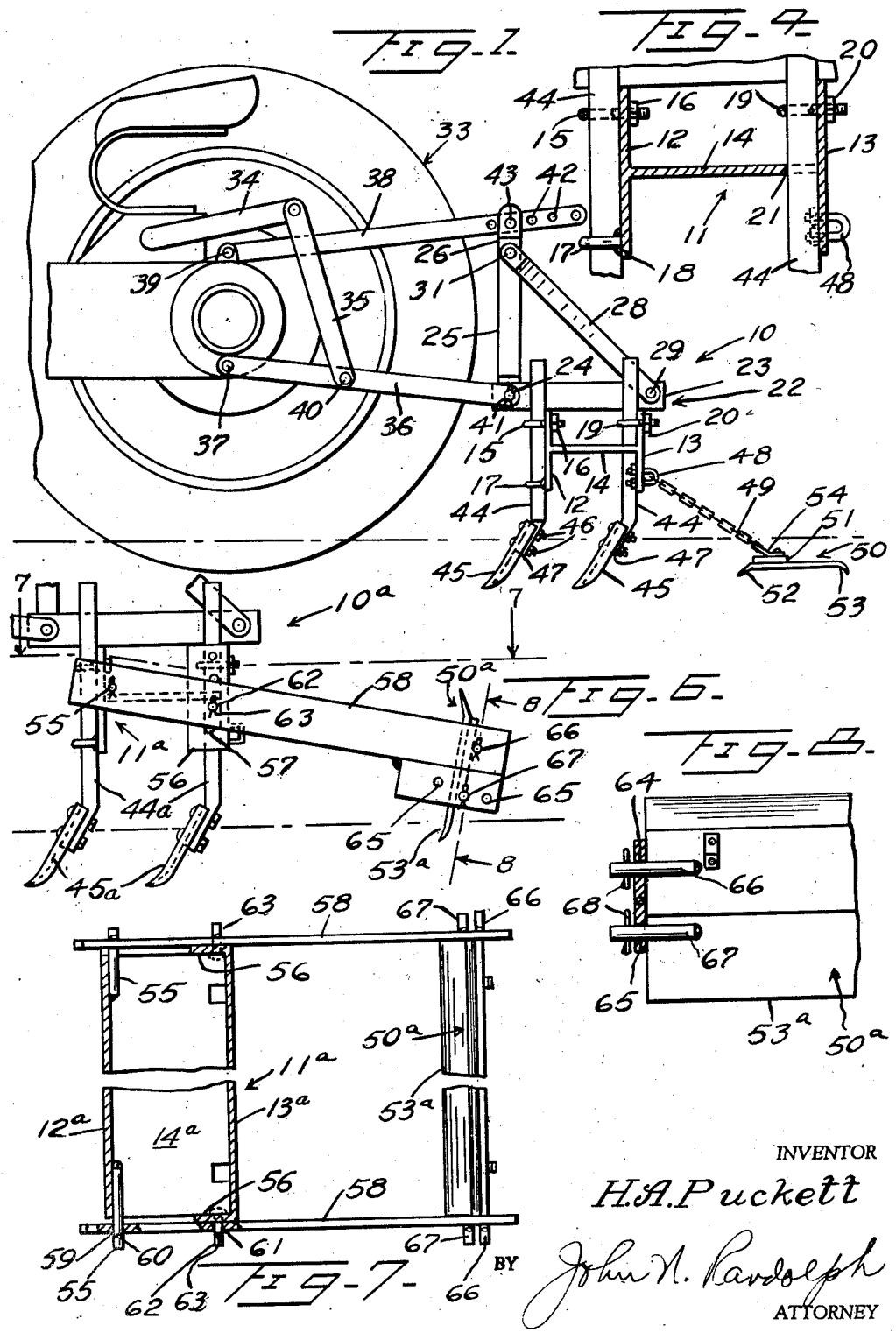
INVENTOR
H. A. Puckett
BY John N. Randolph
ATTORNEY Jan. 21, 1958 H. A. PUCKETT 2,820,405
EARTH WORKING ATTACHMENT FOR TRACTOR
Filed June 22, 1955 2 Sheets-Sheet 2
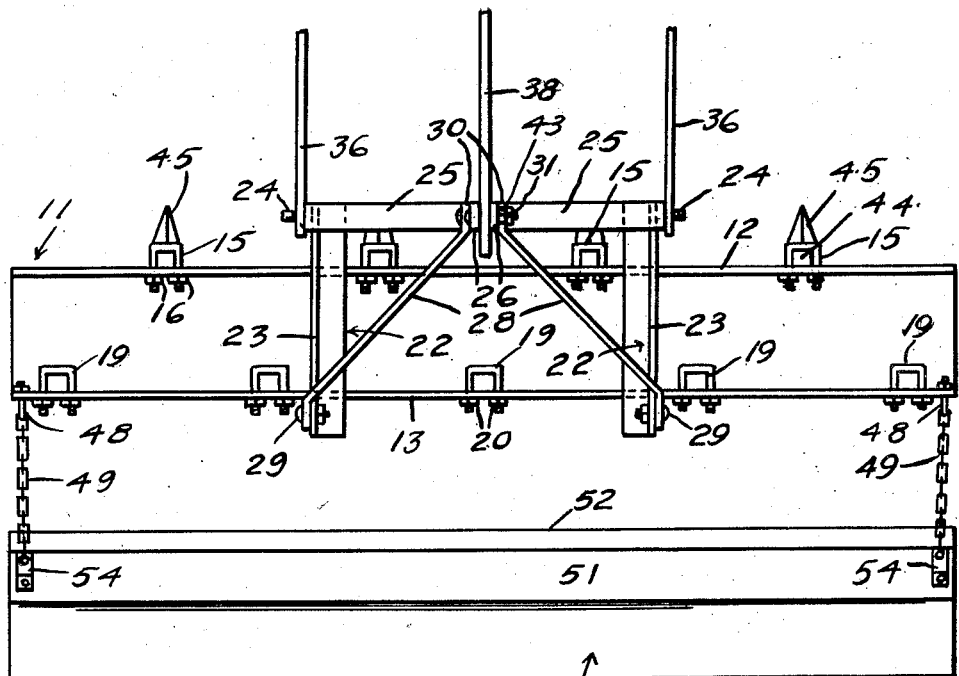
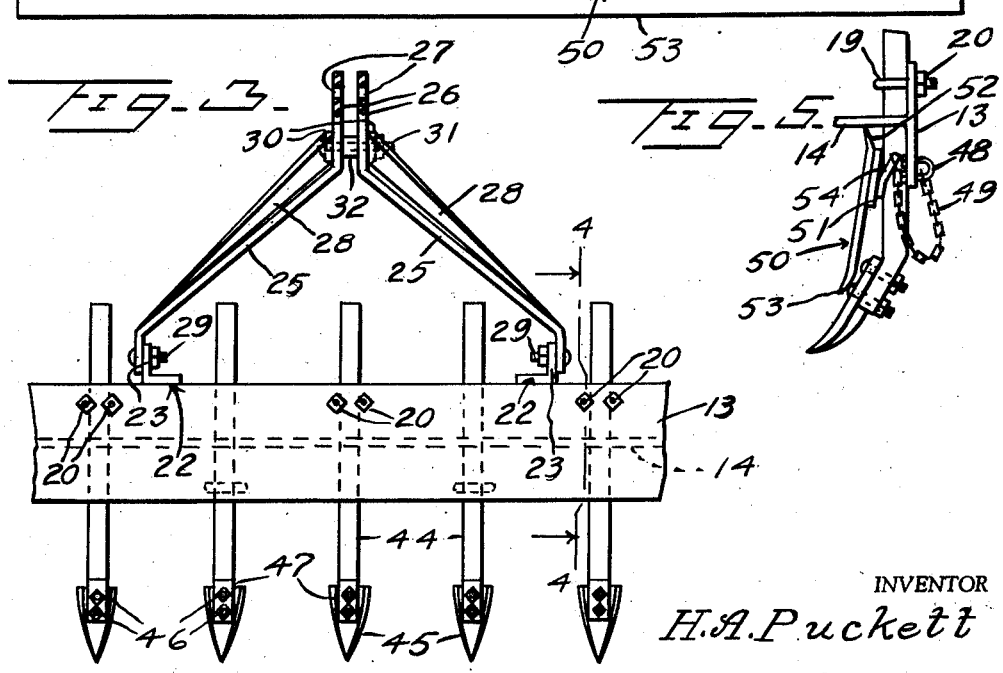
INVENTOR
H. A. Puckett
BY John N. Randolph
ATTORNEY

United States Patent Office 2,820,405
Patented Jan. 21, 1958

2,820,405

EARTH WORKING ATTACHMENT FOR TRACTOR

Henry A. Puckett, Atlanta, Ga.

Application June 22, 1955, Serial No. 517,128

2 Claims. (Cl. 97—9)

This invention relates to an earth working attachment for use on tractors equipped with a hydraulic lift and has for its primary object to provide a combination earth working implement which may be used for plowing, grading, pulverizing, cultivating and terracing.

More particularly, it is a primary object of the present invention to provide an implement of extremely simple construction yet which is capable of performing the functions of three separate implements in connection with ground preparation.

Still a further object of the invention is to provide an implement which will simultaneously perform the functions of the three separate implements usually accomplished by separate operations.

More particularly, it is an aim of the present invention to provide an implement which will prepare the ground in a single operation equivalent to the separate operations as usually performed involving first plowing the ground, thereafter disk harrowing the ground and finally leveling the ground.

Still another object of the invention is to provide an implement which may be very effectively used as a grader.

Various other objects and advantages of the invention will hereinafter become more fully apparent from the following description of the drawings, illustrating presently preferred embodiments thereof, and wherein:

Figure 1 is a side elevational view of the implement shown mounted on the hydraulic lift of a conventional tractor, a part of the rear portion only of which is illustrated;

Figure 2 is an enlarged plan view of the implement including parts of the tractor linkage to which the implement is connected;

Figure 3 is a fragmentary rear elevational view of a part of the implement;

Figure 4 is an enlarged fragmentary vertical sectional view through a part of the implement, taken substantially along a plane as indicated by the line 4—4 of Figure 3;

Figure 5 is a fragmentary side elevational view illustrating an alternate position of the drag blade for use as a grader;

Figure 6 is a fragmentary side elevational view illustrating a modification of the grader;

Figure 7 is a fragmentary horizontal sectional view, taken substantially along a plane as indicated by the line 7—7 of Figure 6 and with certain of the parts omitted, and Figure 8 is an enlarged fragmentary vertical sectional view, taken substantially along a plane as indicated by the line 8—8 of Figure 6.

Referring more specifically to the drawings and first with reference to the invention as disclosed in Figures 1 to 5, the novel combination earth working implement as illustrated therein is designated generally 10 and includes an elongated beam, designated generally 11, of substantially H-shape in cross section having front and rear substantially upright walls 12 and 13, respectively, connected by a substantially horizontal web 14. A series of longitudinally spaced horizontally disposed substantially U-shaped bolts 15 extend rearwardly through openings of the front wall 12, near its upper edge, and have nuts 16 engaging the threaded ends thereof and which bear against the rear side of the wall 12. As best seen in Figure 2, the intermediate portions of the U-bolts 15 are disposed substantially at right angles to the parallel legs thereof. A retaining member 17, of substantially the same shape as the U-bolts 15, is disposed beneath and in vertical alignment with each U-bolt 15 and has the ends thereof extending into the front wall 12, near its bottom edge, and suitably anchored therein as by welding, as indicated at 18. The retaining members 17 are likewise disposed horizontally.

The rear wall 13 is provided with U-bolts 19, corresponding to the U-bolts 15, which extend rearwardly or outwardly therethrough near the upper edge of said wall 13 and which have threaded ends engaged by nuts 20, which bear against the outer or rear side of the wall 13. The web 14 is provided with a square opening 21 located directly beneath each U-bolt 19. As seen in Figure 2, the U-bolts 15 and 19 of the front and rear walls are arranged in staggered relation relative to one another.

A pair of spaced angle members 22 extend across the upper edges of the walls 12 and 13 and are suitably secured rigidly thereto and are disposed between adjacent U-bolts 15 and 19, as seen in Figure 2. Each of the angle members 22 has an upstanding flange 23 extending from end-to-end thereof. The angle members 22 extend forwardly from the front wall 12 and rearwardly beyond the rear wall 13. Pins 24 are suitably fixed to and project outwardly from the flanges 23 near their forward ends. A pair of braces 25 have apertured lower ends which detachably engage on the pins 24. The braces 25 extend upwardly in converging relationship to one another, as seen in Figure 3, from above and adjacent the angle members 22 and have substantially parallel upright disposed upper end portions 26 which are disposed in slightly spaced relation to one another and which have aligned apertures 27 near their upper ends. A pair of rear braces 28 is also provided having lower rear ends which are secured to rear portions of the flanges 23 by nut and bolt fastenings 29 which extend through said braces 28 and through the flanges 23. The braces 28 extend upwardly and forwardly in converging relation to one another and have substantially parallel spaced upper end portions which straddle the brace portions 26, below the openings 27. Said upper portions 30 of the braces 28 are connected to the brace portions 26 of the braces 25 by a nut and bolt fastening 31 which extends through the parts 30 and 26. The bolt of the fastening 31 may carry a spacing element 32 disposed between the parts 26 for maintaining said parts in properly spaced relation to one another.

The implement 10 is adapted to be supported behind a conventional tractor a rear part of which is illustrated in Figure 1 and designated generally 33. The tractor 33 is provided with a conventional hydraulic lift including a pair of lift arms 34 which extend rearwardly and which are mounted for vertical swinging movement. The lift arms 34 have links 35 pivotally connected to and depending from the rear free ends thereof. The tractor 33 is also equipped with a conventional linkage system including a pair of lower laterally spaced supporting arms 36 which are pivotally mounted at 37 at their forward ends for vertical swinging movement, and an upper stabilizing arm 38 which is pivotally mounted at 39 at the forward end thereof. The lower ends of the links 35 are pivotally connected at 40 to the lower supporting arms 36 at points spaced from the pivots 37 thereof. The rear ends of the arms 36 are apertured to pivotally engage on the pins or studs 24 and are detachably held applied thereto in any suitable manner as by means of cotter pins 41 which extend through the outer ends of said studs 24, outwardly with respect to the arms 36. The upper stabilizing arm 38 has longitudinally spaced openings 42 to selectively align with the apertures 27. The rear portion of the arm 38 is disposed between the brace portions 26 and is connected thereto by a nut and bolt fastening 43, the bolt of which engages the apertures 27 and a selected aperture 42, for supporting the implement 10 on the hydraulic lift system of the tractor 33.

A plurality of standards 44 of square cross section are supported on the forward sides of the front wall 12 and rear wall 13. Said standards extend vertically through retaining members 17 and the U-bolts 15 and are adjustably clamped in adjusted positions on the front wall 12 by tightening the nuts 16. Other of the standards 44 extend vertically through the openings 21 and U-bolts 19 and are secured in adjusted positions on the forward side of the rear wall 13 by tightening the nuts 20. The standards 44 are held against rotation by the noncircular cross sectional shape thereof and the corresponding shape of the parts 15, 17, 19 and 21. Suitable earth working blades 45 are detachably secured by fastenings 46 to lower portions 47 of the standards 44 which may be inclined downwardly and forwardly, as illustrated in Figure 1.

As best seen in Figures 1 and 2, a loop connection 48 is secured to and extends rearwardly from the rear wall 13, adjacent each end thereof and preferably adjacent the bottom edge of said wall. Th loop connections 48 may be formed by U-bolt and nut fastenings or any other suitable anchoring means may be provided. A pair of flexible draft elements, such as two lengths of chain 49, have forward ends or links anchored to the beam 11 by engagement with the members 48.

A blade 50, preferably of a length substantially equal to the length of the beam 11 and which is of substantial width, has a reinforcing bar 51 suitably fixed to one side thereof, the upper side as seen in Figures 1 and 2. The reinforcing bar 51 extends from end-to-end of the blade 50 and is spaced from the longitudinal edges 52 and 53 thereof. The edges 52 and 53 are sharpened and are flared, relative to the plane of the blade 50, in directions away from the side of the blade to which the bar 51 is secured. The bar 51 has attaching members 54 secured to its upper exposed side, near the ends thereof, to which the opposite rear ends of the chains or flexible connecting elements 49 are secured.

It will be readily apparent that the earth working cultivator attachment 10 may be raised or lowered by actuating the hydraulic lift arms 34. When lift arms 34 are raised, the supporting arms 36 will be swung upwardly by the links 35 which connect the arms 36 to the left arms 34 for elevating the device 10. The stabilizing arm 38 functions to maintain the web 14 in substantially a horizontal plane at the different levels at which the device 10 is supported. It will also be apparent that the device 10 can thus be lowered to cause the blades 45 to penetrate the earth to any desired extent. The subsurface depth of operation of the blades 45 may also be regulated by vertical adjustment of the standards 44 relative to the beam 11. The hydraulic lift arms 34 can exert sufficient down thrust on the supporting arms 36 to cause the blades 45 to cut down to the subsoil or can be adjusted so that the blades 45 will only cultivate the surface of the ground. The web 14 and the upper parts of the walls 12 and 13 also provide a convenient channel on which weights may be supported which weights, not shown, provide ballast for additionally weighting the attachment 10.

For cultivating, certain of the standards 44 and the blades 45 supported thereby which would otherwise strike the plant rows may be removed. When thus employed, the blade 50 is not utilized.

For ground preparation and pulverizing, the blade 50 is disposed as illustrated in Figures 1 and 2 so as to be dragged behind the blades 45. The downwardly inclined leading edge 52 of the blade 50 will assume a subsoil position when the attachment 10 is being drawn from right to left as seen in Figure 1 so that the blade 50 will actually travel below ground level for cutting, rolling and agitating the earth which has been broken up in advance thereof by the individual blades 45. Thus, the atachment 10 when disposed as seen in Figures 1 and 2 will by a single operation plow the earth, harrow the earth and drag level the ground. The attachment 10 may also be utilized as a grader, as illustrated in Figure 5, by elevating the beam 11, after which the tractor is backed to position said beam over the blade 50. The blade 50 can then be swung upwardly and rearwardly, without detaching the chains 49 from said blade or from the wall 13, to position the blade 50 as illustrated in Figure 5 against the blades 45 and standards 44, which are disposed against the rear wall 13, and with the edge 53 in engagement with the earth and with the blade 50 inclined upwardly and rearwardly therefrom. With the blade 50 thus disposed, the attachment is moved forwardly or from right to left as seen in Figure 5 and the lower edge portion 53 of the blade will then function by engagement with the earth for grading the earth.

Figures 6, 7 and 8 illustrate a slightly modified form of the attachment designated generally 10a, which differs from the attachment 10 only in regard to the blade 50a thereof and the mounting of said blade to function as a grader. For this purpose, the beam 11a has pins 55 suitably anchored in the corners formed by its web 14a and front wall 12a, as seen in Figure 7. The pins 55 extend from the ends of the beam 11a. Plates 56 are suitably secured to each end of the beam 11a, adjacent its rear wall 13a, and are provided with corresponding arcuately spaced openings 57 which are located equal distances from the adjacent pins 55.

A pair of supporting arms 58 have openings adjacent the forward ends thereof which turnably engage on the extending ends of the pins 55, as best seen at 59 in Figure 7. The arms 58 are retained in engagement with the pins 55 by suitable retaining elements 60 such as cotter pins, which extend through the pins 55, outwardly with respect to the arms 58. The arms 58 are also provided with openings 61 which may be disposed to register with selected ones of the openings 57 for receiving pins 62 which extend through the selected openings 57 and the openings 61 and through each of which extends a cotter pin 63 to retain the arms 58 in engagement with the pins 62. Thus, the angular disposition of the arms 58, which extend rearwardly from the beam 11a, may be varied for varying the elevation of the rear end portions of said arms 58.

The rear end portions of the arms 58 are each provided with an upper opening 64 and a plurality of arcuately spaced lower openings 65 which are spaced equal distances from the opening 64. The blade 50a has a pair of laterally spaced pins 66 and 67 fixed to and projecting beyond each end thereof. The aligned pins 66 extend outwardly through the openings 64 and the aligned pins 67 extend outwardly through complementary selected openings 65 for mounting the blade 50a in different angularly adjusted positions relative to the arms 58. Cotter pins or other retaining elements 68 extend detachably through outer portions of the pins 66 and 67 for retaining the arms 58 in engagement with said pins. When the blade 50a is thus supported, the edge 53a thereof is in a lowermost ground engaging position for grading the earth. It will be obvious that the depth that the blade edge 53a will penetrate the ground may be varied by either raising or lowering the beam 11a or by raising or lowering the arms 58 relative to said beam. Likewise, the inclination of the blade 50a upwardly and rearwardly may be varied by selectively positioning the pins 67 in selected openings 65. The attachment 10a may be utilized as a grader either with or without the earth working blades 45a which, with the standards 44a thereof, may be removed, if desired.

Various other modifications and changes are likewise contemplated and may be resorted to, without departing from the spirit or scope of the invention as hereinafter defined by the appended claims.

I claim as my invention:

1. In combination with an earth working implement including an elongated frame supported by a rearwardly extending hydraulic lift system of a tractor behind and crosswise of the tractor and at different elevations, for positioning earth working members which are supported by and depend from the frame at different depths in the ground or in elevated positions above the ground; an elongated blade adapted to rest on the ground behind and substantially parallel to said frame, and flexible members having rear ends connected to end portions of said blade and forward ends connected to end portions of said frame for dragging the blade behind the frame, said blade having a sharpened downwardly flared leading edge adapted to penetrate the ground when the blade is drawn behind the frame, and said flexible members being connected to an upper side of the blade behind and adjacent said leading edge thereof.

2. In an earth working implement as in claim 1, said blade being selectively positioned substantially on edge and bearing against the leading sides of a plurality of aligned ones of said earth working members with one longitudinal edge of the blade in engagement with the ground to function as a grading blade.

References Cited in the file of this patent

UNITED STATES PATENTS

| 615,284 | Kountz | Dec. 6, 1898 |
| 1,618,958 | Kassebeer | Feb. 22, 1927 |
| 1,814,003 | Lown | July 14, 1931 |
| 2,613,581 | Pretzer | Oct. 14, 1952 |

FOREIGN PATENTS

| 15,522 | Netherlands | Dec. 15, 1926 |